United States Patent [19]

Adell

[11] 4,429,013
[45] * Jan. 31, 1984

[54] EDGE GUARD

[75] Inventor: Robert Adell, Sunnyvale, Tex.

[73] Assignee: U.S. Product Development Company, Sunnyvale, Tex.

[*] Notice: The portion of the term of this patent subsequent to Apr. 12, 2000 has been disclaimed.

[21] Appl. No.: 498,739

[22] Filed: May 27, 1983

[51] Int. Cl.³ .......................................... B60R 13/04
[52] U.S. Cl. ..................................... 428/122; 49/462; 52/716; 293/128; 296/207; 428/358
[58] Field of Search ............. 49/462; 52/716; 428/31, 428/122, 358; 293/120, 128, 1; 296/207; 280/770

[56] References Cited

U.S. PATENT DOCUMENTS

| | | | |
|---|---|---|---|
| 2,704,687 | 3/1955 | Adell | 49/462 |
| 2,856,230 | 10/1958 | Adell | 49/491 X |
| 2,887,338 | 5/1959 | Adell | 49/462 |
| 4,259,812 | 4/1981 | Adell | 49/462 |
| 4,316,348 | 2/1982 | Adell | 428/122 X |
| 4,334,700 | 6/1982 | Adell | 280/770 |
| 4,338,148 | 7/1972 | Adell | 428/122 X |
| 4,365,450 | 12/1982 | Adell | 428/122 X |
| 4,379,376 | 4/1983 | Adell | 52/716 X |
| 4,379,377 | 4/1983 | Adell | 52/716 X |

Primary Examiner—Henry F. Epstein
Attorney, Agent, or Firm—Stephenson & Boller

[57] ABSTRACT

An edge guard of the type comprising a metal strip formed into a generally U-shaped transverse cross section having inner and outer legs with beads at the distal ends of the legs via which the edge guard is self-retained on the edge of an object when installed thereon. The cross section has a generally semi-circular contoured base which joins with the two legs. One leg includes an inward offset so that its bead is disposed in inwardly offset relation to the corresponding end of the base. The other leg comprises a straight segment extending straight from the other end of the base to the corresponding bead. The base comprises segments having different radii of curvature. In the free condition of the edge guard, the inner faces of the beads, which bear against opposite sides of an edge when the edge guard is installed thereon, are disposed in non-parallel relation. When the edge guard is installed the flexing of the channel allows the beads to assume a more parallel disposition to engage the opposite sides of the edge.

15 Claims, 4 Drawing Figures

EDGE GUARD

REFERENCE TO RELATED PATENTS AND APPLICATIONS

Reference is made to applicant's related application Ser. No. 469,481, filed Feb. 24, 1983, and U.S. Pat. Nos. 4,379,377 and 4,379,376, issued Apr. 12, 1983.

BACKGROUND AND SUMMARY OF THE INVENTION

This invention relates to ornamental and protective edge guards such as applied to the edges of sheet metal members of automotive vehicles, for example swinging closures such as doors, trunk lids, hoods, gasoline fill doors, and other members such as drip rails, bumper edges, etc.

In the case of the vehicle's doors, door edge guards are applied to the trailing edges to protect them from damage which might be caused by striking an object which may be present in a door's path when the door is opened. It is also desirable for such door edge guards to be made of bright metal such as stainless steel, aluminum, or a bimetal due to the excellent protective and ornamental character of such materials. Furthermore, the inherent strength and resiliency of metallic edge guards enable them to be self-retaining on the doors. Correspondingly it is generally undesirable to use separate fasteners or adhesives in securing door edge guards to doors since they involve extra cost in labor and materials. It is also generally undesirable to use strictly non-metallic edge guards such as plastic edge guards since they do not possess the excellent protective ornamental and self-retention characteristics of bright metallic edge guards. In connection with the usage of self-retaining edge guards, it has heretofore been recognized that the potential for paint scratching and marring exists when the metal edge guards are applied to the vehicle door edges. Such paint scratching can lead to premature corrosion of the door edge metal. Some of applicant's own inventions have addressed this matter of possible paint scratching and corrosion and have provided solutions. Some of applicant's prior inventions are represented by issued U.S. Pat. Nos. 2,704,687; 2,887,338; 2,856,230; 4,259,812; 4,334,700; 4,316,348; 4,338,148; and 4,365,450 and other pending applications, in addition to those mentioned above. Certain of these disclose the use of plastic liners to insulate the metal edge guard from the vehicle door. The liners may be extruded plastic, plastic encapsulation, foam plastic or plastic film by way of example.

For example, certain of these show an edge guard having a laminated plastic lining with the legs of the edge guard having insulated metal beads running along the free ends of the legs and by which the retention force is applied to the door. Metal beads are particularly useful for they can provide a stiffening of the legs at the point of force application to the door while also providing a decorative feature in the case of the insulated metal construction wherein the beads are formed by outwardly reversing the ends of the legs so as to yield a band or narrow strip of the insulating liner exposed to view. The liner can be a dark plastic so that the narrow strip appears as a darker colored band which contrasts with the bright metal of the remaining exposed portion of the edge guard so that the overall appearance of the edge guard is particularly pleasing and/or decorative. The liner can also provide a metallic appearance for the band corresponding to that of the metal, or other desired appearance, for example as disclosed in applicant's pending application Ser. No. 391,619, filed June 24, 1982. The present invention however may be practiced with or without such liners although usage of liners is definitely preferred.

One of the important advantages of metal door edge guards of the type which applicant has invented and successfully developed is that the metal edge guards are self-retaining. This means that no separate fasteners, adhesives or extra procedures are required in order to install the edge guards on the doors. This further means that there is less possibility for corrosive action to be initiated and it means that the installation procedure is less complicated. In many instances the edge to which the edge guard is applied will have a particular contour conforming to the desired styling of the vehicle. In most instances this is other than a straight shape and the contour will have peaks and recesses at selected locations. Applicant has also heretofore invented constructions and procedures for applying self-retaining guards to contoured door edges which have other than a straight shape. For example notches and overbends are procedures which have been applied in order to conform the edge guard to the contour of the door edge and enhance the effectiveness of the legs of the edge guard in retaining the edge guard on the door.

The invention disclosed and claimed in U.S. Pat. No. 4,379,377 is directed to a door edge guard having a new and unique cross sectional shape which provides advantages which have not been obtained with prior edge guards. These advantages involve improved mounting and improved tolerance control of the door edge guard cross section. These in turn can minimize the amount of additional procedures such as notching and overbending which otherwise might have to be applied to a door edge guard. That edge guard provides a stronger edge guard cross section with improved retention capability, yet there are no extra complications of the manufacturing procedure or of the installation procedure. While insulation is preferably utilized with the metal edge guard, it is possible for the edge guard to be constructed without the use of insulation if that is what is desired.

The edge guard of that patent has what may be considered as basically a U-shaped cross section but embodying particular details of the cross section which constitute its inventive features. Ease of installability on an edge is significantly improved, yet secure retention is obtainable. Indeed, the edge guard may require no overbend for contoured edges, and it is possible for notching to be eliminated in certain instances. There is no tendency for the edge guard to "roll off" of the door edge, and this attribute is believed to contribute to the potential for elimination of overbend and notching. Without overbend and/or notching, manufacturing procedures are simplified, a still further benefit.

In accordance with the principles of the invention of U.S. Pat. No. 4,379,377 the edge guard is provided with beads at the distal ends of the legs which are formed by outwardly reversing the metal strip of the edge guard back onto itself. The legs further include an offset whereby the point at which the beads bear against the door edge is inwardly offset. The beads themselves may be either open or closed and they may be either inwardly or outwardly reversed. An insulating liner through which the force is applied to the door edge is also included. The base of the U-shaped cross section is basically of a semi-circular shape which merges into the offsets on opposite sides of the cross section.

In certain door edge guards of the type described in U.S. Pat. No. 4,379,377, the generally semi-circular base of an installed edge guard may constitute an interference to adjacent portions of the automobile body structure for certain positions of operation of the door. The present invention is directed to a further improvement in door edge guards, particularly an improvement upon that shown in U.S. Pat. No. 3,379,377. More specifically, the invention comprises the edge guard along one half of the cross section being re-shaped so as to thereby provide a suitable clearance for a condition such as referred to above. In the preferred embodiment, the generally semi-circular base has different radii of curvature, and one leg of the edge guard is made substantially straight. The opposite leg retains similar novel features to those in U.S. Pat. No. 4,379,377 with the resultant construction still possessing excellent characteristics such as those described in that patent.

The foregoing features, advantages, and benefits of the invention, along with additional ones, will be seen in the ensuing description and claims which should be considered in conjunction with the accompanying drawings. The drawings disclose preferred embodiments of the invention according to the best mode contemplated at the present time for carrying out the invention.

DESCRIPTION OF THE PREFERRED EMBODIMENT

Figure 1:
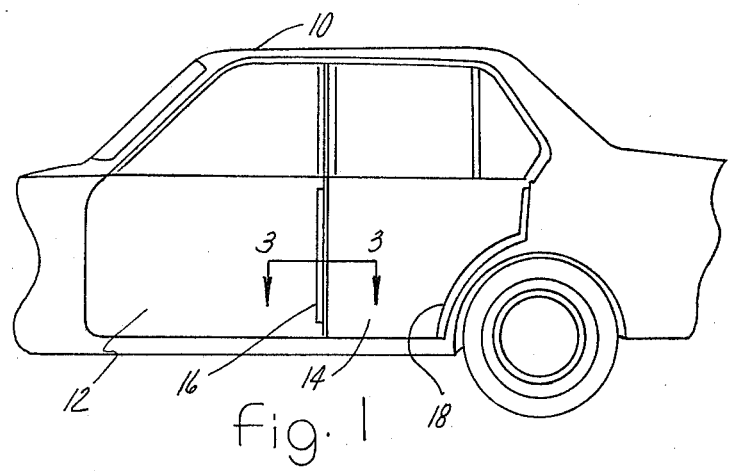
FIG. 1 is a fragmentary side elevational view of a vehicle containing door edge guards embodying principles of the present invention.

FIG. 1 shows a portion of an automobile 10 comprising front and rear doors 12 and 14 on the trailing edges of which are door edge guards 16 and 18 respectively embodying principles of the present invention. The edge guards are generally elongate and essentially coextensive in length with the trailing edges of the doors, each guard conforming to the contour of the trailing edge of its door. It will be appreciated that the actual length of any edge guard may be different from the length of its door's trailing edge and therefore the drawing is intended to be merely exemplary.

Figure 2:
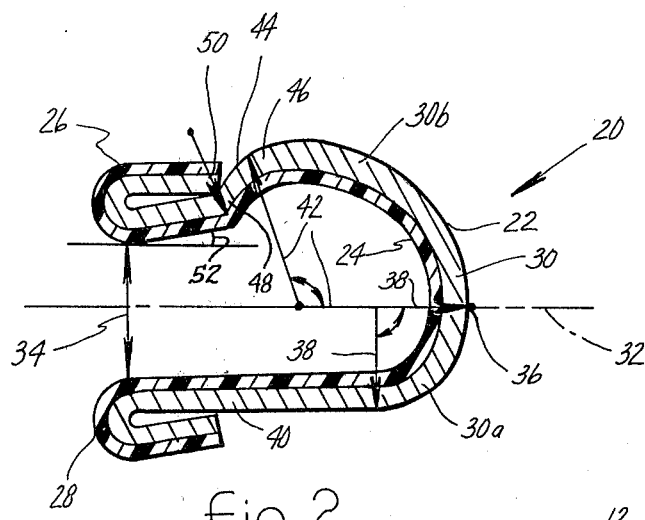
FIG. 2 is a transverse cross sectional view through a door edge guard embodying principles of the invention and shown by itself.

FIG. 2 illustrates a transverse cross section 20 for the edge guard embodying principles of the present invention. While the cross section illustrated represents the desired engineering design shape for the edge guard in its free condition after its fabrication, it will be appreciated that in actual specimens the cross section at any given point in a specimen may depart slightly from the desired engineering shape. These reasons generally are attributed to manufacturing operations. One reason is that the metal distorts and deforms when cut. Where the beads are squeezed and deformed, they may in actual practice become slightly distorted. Also, where the edge guard is shaped to conform to a sweep in the edge contour, the cross section may also distort. However, the strength of the cross section provides dimensional control of the throat of the channel and in turn provides self-retention and installation characteristics.

The illustrated embodiment is an insulated metal edge guard comprising a metal edge guard 22 and an insulating liner 24. In this embodiment the insulating liner 24 is a plastic such as vinyl which is applied in surface-to-surface contact with the full surface of one side of the metal strip from which the edge guard 22 is formed. Details of this fabrication procedure are disclosed in certain of applicant's patents and applications referred to above. The resultant construction has insulated metal beads 26 and 28 respectively at the distal ends of the two legs of the cross section. The door edge guard cross section may be considered basically of a U-shape; however, the particular features of the edge guard provide new and unique structural aspects providing improved characteristics.

The edge guard is formed into the illustrated shape through roll forming procedures and this shape may be considered as constituting a generally semi-circular segment 30 constituting the base of the U. In using this as well as the ensuing terminology it will be appreciated that such terminology is intended to be construed by way of illustration and not by way of limitation.

In describing the cross section, reference will be made to an imaginary central plane which in general bisects the cross section throughout the length of the edge guard. This plane is identified by the reference numeral 32 in FIG. 2. It will be observed that the cross section is not symmetrical about plane 32. As viewed in FIG. 2, the upper portion of the cross section lying above plane 32 corresponds in general to the cross section illustrated in the edge guard of applicant's U.S. Pat. No. 4,379,377. The lower portion of the cross section as viewed in FIG. 2 differs in that it comprises a generally straight leg, not including a curved bend offset as does the other leg.

More specifically, the construction may be described with reference to plane 32 such that plane 32 passes through the midpoint of the throat opening 34. Plane 32 is disposed perpendicular to throat opening 34, and it intersects the generally semi-circular U-shaped base at the point 36. Point 36 is conveniently referenced to the outside surface of the metal channel, for illustrative purposes.

The generally semi-circular base 30 may be considered as comprising one segment 30a and another segment 30b. Segment 30a is defined by a radius of curvature 38, which as viewed in FIG. 2, extends 90° in a clockwise sense from plane 32 to a merger into the straight leg segment containing bead 28. This straight leg segment is identified by the reference numeral 40 and it extends from the point of merger with the segment 30a to throat 34, the distal end containing bead 28 which is formed by turning the free marginal edge of the insulated metal strip outwardly back onto itself such that the bead is set outwardly relative to leg 40.

Figure 3:
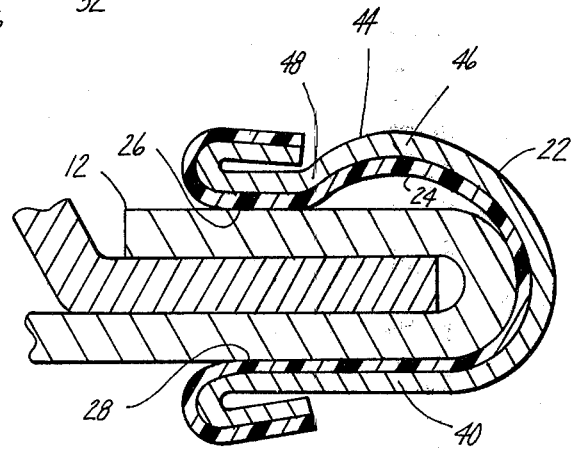
FIG. 3 is a transverse cross sectional view illustrating the edge guard of FIG. 2 in an installed position on a vehicle door edge, such as taken in the direction of arrows 3—3 in FIG. 1.
Figure 4:
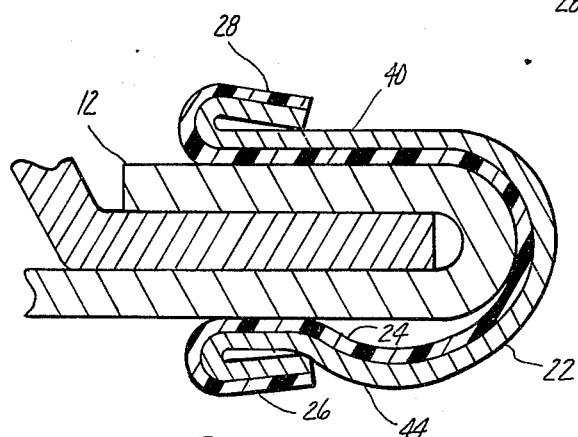
FIG. 4 is a view similar to FIG. 3 illustrating an alternate installation on a vehicle door edge.

Segment 30b of the generally semi-circular base is defined by a different radius of curvature 42 which is somewhat larger than the radius of curvature 38. Segment 30b extends in the counter-clockwise sense from its point of merger with segment 30a somewhat greater than 90°. Thus, the segment 30b may be considered as starting to form a part of the other leg 44 with the inclusion of a curved inward offset 46 constituting the excess of 90° of the span of segment 30b from segment 30a. This curved inward offset 46 joins with a further curved section 48 having a radius of curvature 50. This segment 48 reverses the curvature to merge into the bead 26 such that the inner face of the bead is inclined at a small acute angle 52 relative to a plane parallel to the inner face of the bead of the opposite leg and to imaginary plane 32. Thus, in the free condition, the insulated bead surfaces which are intended to bear against opposite sides of the door edge when the edge guard is installed thereon are not parallel. By providing selected non-parallelism to the inner faces of the beads, the flexing of the cross section about the base, when installed on a door edge, the bearing points of the beads may be generally flat against opposite sides of the door edge, as shown in FIGS. 3 and 4.

As explained above, the invention is useful in that it allows one half of the cross section (i.e. the straight leg) to be disposed more closely to the door edge and thereby minimize the possibility that the installed edge guard will interfere with adjacent portions of the vehicle body structure. In the FIG. 3 illustration, the straight leg constitutes the outer leg of the installed edge guard while in the FIG. 4 illustration the straight leg constitutes the inner leg. Yet, the shape imparted to the opposite (i.e. curved offset) leg still provides very acceptable mounting characteristics for the edge guard as explained above.

It will be noted that in the preferred embodiment the insulating layer has been applied in surface-to-surface contact with the metal strip from which the edge guard is formed. Alternate constructions are possible within the scope of the invention. For example, the edge guard could be formed from metal and the insulating layer, which is certainly preferred, applied separately onto the door edge before the metal edge guard is installed. The material of the liner also can be of any suitable composition which protects against electro-chemical action so that it is possible that other than vinyl liners be used. For example, a foam tape or other similar material is also suitable for use. The cross section has resistance to collapse and dimensional stability, yet can be readily mounted on a door edge. The cross section is also not susceptible to "rolling off" the door edge.

While a preferred embodiment of the invention has been disclosed, it will be appreciated that principles of the invention can be applied to other embodiments.

What is claimed is:

1. In an edge guard of the type comprising a metal strip formed into a generally U-shaped transverse cross section having inner and outer legs and beads at the distal ends of the legs via which the edge guard is self-retained on the edge of an object when installed thereon, the improvement wherein the U-shaped cross section has a generally semi-circular contoured base and includes an inward offset joining one end of the base with the corresponding bead on one leg so that such bead is disposed in inwardly offset relation to the corresponding end of the generally semi-circularly contoured base, and wherein the cross section has the other leg comprising a straight segment extending straight from the other end of the generally semi-circularly contoured base to the corresponding bead.

2. The improvement set forth in claim 1 wherein the generally semi-circular base has a span of greater than 180° and said inward offset constitutes an excess of said 180° span.

3. The improvement set forth in claim 1 wherein said generally semi-circular contoured base comprises segments defined by different radii of curvature.

4. The improvement set forth in claim 3 wherein one segment of said base joins with said other leg and another segment of said base joins with said one leg, said one segment and said another segment having different radii of curvature.

5. The improvement set forth in claim 4 wherein said one segment has a smaller radius of curvature than said other segment.

6. The improvement set forth in claim 5 wherein said one segment of said base has a span of substantially 90°.

7. The improvement set forth in claim 6 wherein said other segment of said base has a span greater than 90°.

8. The improvement set forth in claim 5 in which said one segment of said base has a smaller span than said other segment of said base.

9. The improvement set forth in claim 1 in which said cross section, in the free condition of said edge guard, comprises said beads having inner surfaces facing each other which are non-parallel.

10. The improvement set forth in claim 9 wherein the inner bead surface of the bead on said other leg constitutes a straight continuation of said straight segment of said other leg.

11. The improvement set forth in claim 1 including an insulating liner lining the interior of the U-shaped cross section including said beads.

12. The improvement set forth in claim 1 wherein said straight segment tangentially joins to said other end of said semi-circularly contoured base and said base extends therefrom in a span of substantially 90° about a given radius of curvature and from the end of said 90° span continues as a further span extending the remainder of said generally semi-circular contoured base at a radius of curvature greater than said given radius of curvature.

13. The improvement set forth in claim 12 in which said span extending from said 90° span has an extent greater than 90° and continues via a curved bend into the bead on said one leg, said beads having inner surfaces which in the free condition of the edge guard are non-parallel with the beads being closer together at the extreme distal ends of their respective legs than at points more interior of said extreme distal ends of their respective legs.

14. In an edge guard of the type comprising a metal strip formed into a generally U-shaped channel having inner and outer legs via which the edge guard is self-retained on the edge of an object when installed thereon, the improvement wherein the distal end of one leg is inwardly offset relative to a proximal portion of the same leg, said distal end being joined to said proximal portion by a curved offset, and wherein the opposite leg comprises a straight segment, the distal ends of said legs comprising respective beads having inner surfaces which in the free condition of the channel are disposed in non-parallel planes.

15. The improvement set forth in claim 14 in which the generally U-shaped channel comprises a generally semi-circular base which extends between the two legs, said generally semi-circular base comprising two segments one of which has a span of approximately 90° and is defined by a given radius of curvature and which joins to the straight segment and the other of which segments comprises a span of slightly greater than 90° and is defined by a radius of curvature greater than given radius of curvature and which joins with the bead on the leg containing the curved offset.

* * * * *